(12) United States Patent
Black et al.

(10) Patent No.: US 10,282,279 B2
(45) Date of Patent: *May 7, 2019

(54) SYSTEM AND METHOD FOR DIAGNOSING INFORMATION TECHNOLOGY SYSTEMS IN MULTIPLE VIRTUAL PARALLEL UNIVERSES

(71) Applicant: CA, Inc., New York, NY (US)

(72) Inventors: Alvin Black, Spanish Fork, UT (US); Debra J. Danielson, Somerset, NJ (US); Jack Zito, Yaphank, NY (US)

(73) Assignee: CA, INC., Islandia, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/287,251

(22) Filed: Oct. 6, 2016

(65) Prior Publication Data

US 2017/0024240 A1    Jan. 26, 2017

Related U.S. Application Data

(63) Continuation of application No. 12/961,231, filed on Dec. 6, 2010, now Pat. No. 9,479,416.

(51) Int. Cl.
*G06F 11/36* (2006.01)
*G06F 3/06* (2006.01)
(Continued)

(52) U.S. Cl.
CPC ........ *G06F 11/3664* (2013.01); *G06F 3/0608* (2013.01); *G06F 3/0611* (2013.01); *G06F 3/0641* (2013.01); *G06F 3/0644* (2013.01); *G06F 3/0686* (2013.01); *G06F 9/45558* (2013.01); *G06F 9/5077* (2013.01); *G06F 2009/45562* (2013.01); *G06F 2009/45591* (2013.01)

(58) Field of Classification Search
CPC ................... G06F 11/079; G06F 9/455; G06F 2009/45562; G06F 11/3664

See application file for complete search history.

(56) References Cited

U.S. PATENT DOCUMENTS 5,552,984 A    9/1996 Crandall et al.
5,805,796 A    9/1998 Finch et al.
(Continued)

*Primary Examiner* — Gabriel Chu
(74) *Attorney, Agent, or Firm* — Pillsbury Winthrop Shaw Pittman LLP

(57) ABSTRACT

The system and method for diagnosing information technology systems in multiple virtual parallel universes described herein may create virtualized parallel universes that represent a problematic information technology system. The virtualized parallel universes may then be diagnosed to identify potential solutions to a problem experienced in the problematic information technology system (i.e., the parallel universes may be diagnosed without disrupting the live problematic system). For example, the problematic information technology system may be cloned in response to a diagnostic request associated therewith to create various virtualized parallel universes representing the problematic information technology system. The parallel universes may then conduct various problem resolution steps to identify a potential solution to the problem, which may then be applied to the problematic information technology system to resolve the problem associated therewith.

19 Claims, 4 Drawing Sheets

(51) Int. Cl.
    *G06F 9/455*     (2018.01)
    *G06F 9/50*     (2006.01)

(56) References Cited

U.S. PATENT DOCUMENTS

| | | |
|---|---|---|
| 6,298,457 B1 | 10/2001 | Rachlin et al. |
| 6,895,534 B2 | 5/2005 | Wong et al. |
| 7,050,813 B1 | 5/2006 | Paiz |
| 7,228,344 B2 | 6/2007 | Whitlow |
| 2003/0139906 A1 | 7/2003 | Barford |
| 2005/0144264 A1 | 6/2005 | Gruhn et al. |
| 2006/0150018 A1 | 7/2006 | Cousin et al. |
| 2008/0072101 A1 | 3/2008 | Archer et al. |
| 2008/0271019 A1 | 10/2008 | Stratton et al. |
| 2010/0293144 A1 | 11/2010 | Bonnet |
| 2011/0083122 A1* | 4/2011 | Chen ................. G06F 11/3664 717/124 |
| 2011/0154331 A1* | 6/2011 | Ciano ................ G06F 9/45558 718/1 |
| 2011/0161730 A1 | 6/2011 | Van Der Merwe et al. |
| 2011/0239052 A1 | 9/2011 | Nguyen |
| 2011/0320882 A1 | 12/2011 | Beaty et al. |

\* cited by examiner

SYSTEM AND METHOD FOR DIAGNOSING INFORMATION TECHNOLOGY SYSTEMS IN MULTIPLE VIRTUAL PARALLEL UNIVERSES

This application is a continuation of U.S. patent application Ser. No. 12/961,231, which was filed on Dec. 6, 2010, and is now allowed. The foregoing application is incorporated herein in its entirety by reference.

FIELD

The invention generally relates to a system and method for diagnosing information technology systems in multiple identical and complete virtual system clones, wherein the virtual system clones may be referred to herein as "virtual parallel universes" (or a "multiverse" that represents a set with multiple "parallel universes"), and in particular, to creating one or more virtualized parallel universes instantiated or otherwise cloned from a problematic information technology system and conducting various problem resolution steps, resolution verification tests, and other diagnostics in the virtualized parallel universes to identify potentially acceptable solutions to one or more problems reported in the problematic information technology system without disrupting the problematic system.

BACKGROUND

In many information technology organizations, workers, customers, and other users typically interact with multiple systems and applications during daily routines. Further, due to customers, partners, and employees increasingly demanding anytime, anywhere access to critical applications, information, and services, virtualized data centers, cloud applications, and other distributed work environments have become technologies with increasing importance in the information technology community. However, although recent information technology developments have created new opportunities to increase revenues, manage costs, and deepen relationships with users, diagnosing or otherwise supporting information technology data centers can present significant challenges. In particular, systems that currently attempt to diagnose or otherwise resolve problems associated with information technology systems tend to involve a sequence of diagnostic steps commonly suggested to provide potential options to fix or diagnose a problem. For example, a support representative may ask a customer to change a certain configuration parameter, restart a service, reboot a machine, and so on throughout the diagnostic process. However, these steps often must be done one at a time, and moreover, often have the potential to impact functions in production systems that may be in active use.

Consequently, managing diagnostic and other troubleshooting processes presents an ongoing challenge in the information technology community. Oftentimes, existing approaches to resolve user troubleshooting requests can break down due to information silos that present barriers to sharing knowledge that may address a particular problem. In modern information technology environments, which are increasingly complex, troubleshooting problematic systems requires visibility into the infrastructure to successfully support services that may be running therein. However, techniques currently used to diagnose problematic systems typically involve sequential and time-consuming trial-and-error approaches, which even if successful, are typically not modeled in a manner that would enable subsequent diagnostic processes to utilize any knowledge gained from the prior diagnosis effort. Moreover, because existing diagnostic techniques typically take control over a system that has been reported problematic, productivity often suffers while the diagnostic processes occupy needed resources.

SUMMARY

According to one aspect of the invention, a system and method for diagnosing information technology systems in multiple virtual parallel universes may employ a virtualized infrastructure to automatically create various virtual machines and software, configurations, connections, and data that represent a problematic system. For example, many information technology systems have become increasingly virtualized, whereby the system and method described herein may employ virtual machine technology to create an array that includes one or more "parallel universes" that represent virtual clones of the problematic system. As such, the parallel universe array may be created in response to a troubleshooting or other diagnostic request associated with the problematic system, wherein a problem resolution controller may then initiate one or more "brute force" attempts to identify one or more variables that may be contributing to a problem experienced in the problematic system. For example, troubleshooting or diagnostic processes commonly involve asking a customer or other user to reboot one or more machines in the problematic system to determine whether the reboot makes the problem "go away." Accordingly, the problem resolution controller may automate different diagnostic attempts in various parallel universes that represent different virtual instantiations cloned from the problematic system, wherein the different diagnostic attempts may be automated in parallel to the working production system (i.e., without disrupting or otherwise interrupting ongoing activity that may be occurring in the problematic system).

According to one aspect of the invention, to create the parallel universe array that includes the virtual clones representing the problematic system, the system and method described herein may store various virtual machine templates in a resource pool. As such, in response to the troubleshooting or other diagnostic request associated with the problematic system, the problem resolution controller may obtain one or more virtual machine templates from the resource pool that appropriately correspond to various hardware and software settings associated with systems, machines, applications, or other resources in the problematic system. In one implementation, the problem resolution controller may then clone one or more virtual machines that represent the problematic system from the virtual machine templates to create a master clone that represents a virtual clone of the problematic system, and further to create the parallel universes that represent virtual clones of the problematic system. The problem resolution controller may then attempt various diagnostic processes in the parallel universes without impacting the live problematic system or the master clone created therefrom. Furthermore, the system and method described herein may have a monitoring engine intercept input parameters to the original problematic production system and broadcast the input parameters to the problem resolution controller, which may then multicast the input parameters to the parallel universe environment (e.g., to ensure that the parallel universe environment suitably represents ongoing activity that may occur in the problematic system subsequent to creating the master clone or the parallel universes). Additionally, a diagnostic library may be created, either statically or dynamically, wherein the diagnostic library may contain information describing various actions that may potentially resolve a particular problem. As such, the problem resolution controller may reference the diagnostic library to identify one or more actions, tests, or other diagnostic processes that may be used to automate diagnostic trials performed on the parallel universes.

According to one aspect of the invention, the system and method described herein may receive an initial input that includes the problematic system or environment and one or more particular problems identified in the problematic system or environment. For example, the problematic system input to the problem resolution controller may include a particular process or application, a complex collection that includes multiple interacting processes, applications, and systems, or any other suitable subset associated with the problematic system, up to and including the entire problematic system. Furthermore, the problems associated with the problematic system input to the problem resolution controller may be loosely defined to encompass any suitable minor or critical issues. In one implementation, the problem resolution controller may parameterize the identified problems to derive one or more measurements or tests that can determine whether or not the problems have been resolved. For example, the measurements used to determine whether the problems have been resolved may include a Boolean test, a degree of improvement test, or any other suitable tests or measurements that parameterize the problems and the diagnostic outcome. Accordingly, various problems and solution tests may be codified in structured rules or rule sets that can be used to automate diagnosing the problematic system within the parallel universe environment. Furthermore, because multiple problems may be addressed substantially simultaneously with the system and method described herein, the input that identifies the particular problems to be diagnosed may include an urgency or criticality parameter that the problem resolution controller references to balance or otherwise allocate resources committed to simultaneously attempting to resolve the various different problems.

According to one aspect of the invention, the system and method described herein may create a master clone that represents a virtual clone of the problematic system in response to receiving a diagnostic request associated with the problematic system. In particular, the master clone may permit the problem resolution controller to attempt diagnostic processes to resolve the problem on a static copy of the problematic system, which may ensure that any symptoms associated with the problem do not change for reasons other than any diagnostic processes applied to the parallel universes during problem resolution attempts. Thus, in response to suitably creating the master clone, the problem resolution controller may then analyze the master clone to verify that the master clone exhibits the same problems or symptoms exhibited in the (cloned) problematic system. In response to suitably verifying that the master clone exhibits the same problems or symptoms as the problematic system, the appropriate diagnostic attempts may proceed, or alternatively the problematic system may be probed to attempt re-creating the master clone until the master clone substantially exhibits the same problems or systems as the problematic system.

According to one aspect of the invention, the system and method described herein may codify various problem resolution steps in addition to various resolution verification tests in the diagnostic library, wherein the resolution verification tests may be used to validate a potential solution to a problem that was found with the problem resolution steps. In one implementation, the codified problem resolution steps and the resolution verification tests may be made available to the problem resolution controller to apply in any suitable diagnostic effort, and may include diagnostic processes available to apply to any exhibited problem, diagnostic processes having particular significance to certain identifiable problems, and so on. For example, the problem resolution steps contained in the diagnostic library may include, among other things, restarting a process, rebooting a system, applying a missing patch, changing configuration settings, allocating additional memory, or any other suitable problem resolution steps that may resolve or diagnose a particular problem. Furthermore, in one implementation, the diagnostic library may include the problem resolution steps and/or the resolution verification tests in a flat or hierarchical structure, wherein the problem and resolution steps and/or the resolution verification tests may be entirely codified, contained, and managed in the diagnostic library, or the diagnostic library may alternatively be federated with one or more external test management systems.

According to one aspect of the invention, the system and method described herein may maintain a weighting parameter that represents a likelihood that certain problem resolution steps provide a potential solution to a particular problem. Additionally, a cost parameter may be maintained to codify estimated resource costs that executing the associated problem resolution steps will likely incur. In one implementation, values associated with the weighting parameter and the cost parameter may be manually adjusted or automatically adjusted based on empirical evidence from previous diagnostic attempts. Furthermore, the values associated with the weighting parameter or the cost parameter may be adjusted at a template level, within a particular problem resolution step associated with a standalone set of problem resolution steps, or in any other suitable manner. Moreover, the problem resolution controller may execute one or more of the resolution verification tests in the diagnostic library to verify that applying a particular available solution in one of the parallel universes did not create undesirable side effects. For example, in response to determining whether a particular solution created undesirable side effects, a risk rating parameter may be created to codify a likelihood that the solution will create undesirable side effects. The risk rating parameter may then be maintained in the diagnostic library and subsequently used to distinguish a "best" solution (from multiple potentially successful solutions) to apply in the problematic system.

According to one aspect of the invention, the system and method described herein may use a resource pool that contains available virtualized resources that can instantiate various virtual machines from the available virtualized resources, wherein the virtual machines may be instantiated to create the parallel universes from the master clone. Furthermore, in response to determining that certain problem resolution steps selected from the diagnostic library contain sub-trees of potential solutions, the problem resolution controller may further create and maintain a "sub-master" clone to provide a source image that can be used to create parallel universes that execute different branches of the potential solutions in the sub-trees. The problem resolution controller may further use the urgency or criticality parameter associated with the reported problem to determine a number of the parallel universes to create and dedicate to resolving the reported problem. In particular, the urgency or criticality parameter associated with the reported problem may be referenced in a context associated with any urgency or criticality parameters associated with other problems that the problem resolution controller may be attempting to resolve at substantially the same time, wherein the problem resolution controller may determine how many dedicated parallel universes to create to attempt resolving or otherwise diagnosing the reported problem. In one implementation, the number of parallel universes dedicated to resolving the reported problem may dynamically vary in response to changing conditions associated with the set of problems currently subject to diagnosis.

According to one aspect of the invention, the system and method described herein may initially create the various parallel universes from the master clone associated with the problematic system (i.e., the problematic system may be cloned to create the master clone, and the master clone may be cloned to create the parallel universes). In one implementation, the problem resolution controller may then identify various problem resolution steps in the diagnostic library that have highest priorities and apply individual ones (or sets) of the highest priority problem resolution steps in individual ones of the parallel universes. In response to suitably completing the problem resolution steps in the individual parallel universes, the problem resolution controller may then store statistical metrics or other information on any resources used to conduct the problem resolution steps and outcomes or other results produced therefrom. As such, the statistics associated with the resources used to conduct the problem resolution steps may be used to update the cost parameters maintained with the associated problem resolution steps, while the statistics associated with the outcomes or results produced from the problem resolution steps may be used to update the associated weighting parameters. The problem resolution controller may then recycle the resources used to create the prior parallel universes to recreate a new parallel universe from the master clone. As such, the problem resolution controller may continue to create new parallel universes and conduct problem resolution steps in the parallel universes until one or more potentially acceptable solutions have been found. In one implementation, a parameter may control whether the problem resolution controller stops creating and executing problem resolution steps in new parallel universes once one potentially acceptable solution to the problem has been found, or whether the problem resolution controller will continue creating and executing problem resolution steps in new parallel universes until all potentially acceptable solutions have been found. In one implementation, in response to identifying multiple potentially acceptable solutions to a reported problem, one or more of the potentially acceptable solutions may be applied to the original problematic system, either via manual or rule-based selection.

According to one aspect of the invention, the system and method described herein may intercept and multicast input parameters to the original problematic system in order to resolve certain reported problems or conduct the resolution verification tests on any potentially acceptable solutions that have been found. In particular, a monitoring engine may monitor the problematic system in a substantially continuous manner to detect any input parameters to the problematic system, wherein the monitoring engine may intercept and broadcast any such input parameters to the problem resolution controller. As such, the problem resolution controller may then multiplex and/or multicast the input parameters to the parallel universes in order to ensure that the parallel universes reflect a current operational state within the problematic system. Furthermore, the problem resolution controller may analyze the input parameters received from the monitoring engine to determine whether the input parameters have caused the original problematic system to diverge from the previously created master clone, wherein the problem resolution controller may create a new master clone in response to the input parameters causing the problematic system to diverge from the previously created master clone to synchronize the parallel universes with the live production system.

Other objects and advantages of the invention will be apparent to those skilled in the art based on the following drawings and detailed description.

DETAILED DESCRIPTION

Figure 1:
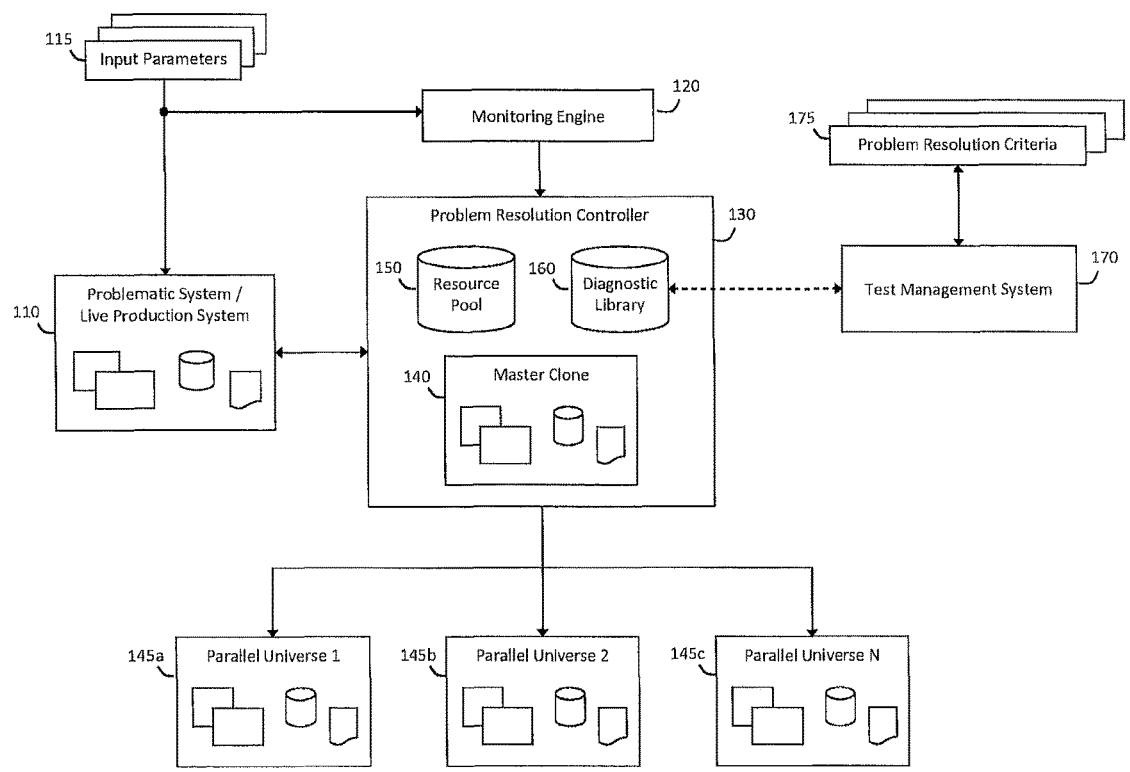
FIG. 1 illustrates an exemplary system for diagnosing information technology systems in multiple virtual parallel universes, according to one aspect of the invention.

According to one aspect of the invention, FIG. 1 illustrates an exemplary system 100 for diagnosing information technology systems in multiple virtual parallel universes. In particular, the system 100 illustrated in FIG. 1 may employ a virtualized infrastructure to automatically create various virtual machines that represent a problematic system 110. For example, many data centers, work environments, and other production information technology systems have become increasingly virtualized, whereby the system 100 may employ virtual machine technology to create an array that includes one or more "parallel universes" 145 that represent virtual clones of the problematic system 110. As such, in one implementation, the system 100 may create the parallel universe array 145 in response to a troubleshooting or other diagnostic request associated with the problematic system 110, wherein a problem resolution controller 130 may then initiate one or more "brute force" attempts to identify one or more variables that may be contributing to a problem experienced in the problematic system 110. For example, many troubleshooting or diagnostic processes commonly involve asking a customer or other user to reboot one or more machines in the problematic system 110 to determine whether the reboot makes the problem "go away." Accordingly, in one implementation, the problem resolution controller 130 may automate different diagnostic attempts in various parallel universes 145 that represent different virtual instantiations cloned from the problematic system 110, wherein the different diagnostic attempts may be automated in parallel to the working production system 110 (i.e., the diagnostic attempts may be automatically performed in the parallel universes 145 without disrupting or otherwise interrupting ongoing activity that may be occurring in the problematic system 110).

In one implementation, to create the parallel universe array 145 that includes one or more virtual clones representing the problematic system 110, the problem resolution controller 130 may include a resource pool 150 storing various virtual machine templates (e.g., virtual machine description files having pre-configured hardware and software settings that can be used to repeatedly create new virtual machines configured with such hardware and software settings). As such, in response to the troubleshooting or other diagnostic request associated with the problematic system 110, the problem resolution controller 130 may obtain one or more virtual machine templates from the resource pool 150 that appropriately correspond to various hardware and software settings associated with any systems, machines, applications, or other resources in the problematic system 110. In one implementation, the problem resolution controller 130 may then clone one or more virtual machines that represent the problematic system 110 from the virtual machine templates in the resource pool 150 that substantially correspond to the various resources in the problematic system 110. In particular, the problem resolution controller 130 may create a master clone 140 that represents a virtual clone of the problematic system 110 and one or more parallel universes 145 that further represent virtual clones of the problematic system 110, wherein the problem resolution controller 130 may then attempt various diagnostic processes in the parallel universes 145 without impacting the live problematic system 110 or the master clone 140 created therefrom.

In one implementation, the system 100 shown in FIG. 1 may therefore include the problem resolution controller 130 to assist in cloning and parallelizing the problematic system 110. Furthermore, in one implementation, the system 100 may include a monitoring engine 120 that can intercept input parameters 115 to the original problematic production system 110 and broadcast the input parameters 115 to the problem resolution controller 130, which may then multicast the input parameters 115 to the parallel universe environment 145 (e.g., to ensure that the parallel universe environment 145 suitably represents ongoing activity that may occur in the problematic system 110 subsequent to the problem resolution controller 130 creating the parallel universes 145). Additionally, in one implementation, the system 100 may create a diagnostic library 160, either statically or dynamically, wherein the diagnostic library 160 may contain information describing various actions that may potentially resolve a particular problem. As such, in one implementation, the problem resolution controller 130 may reference the diagnostic library 160 to identify one or more actions, problem resolution steps, or other diagnostic processes that may be used to automate diagnostic trials performed on the parallel universes 145.

In one implementation, an initial input to the problem resolution controller 130 may generally include the problematic system or environment 110 and one or more particular problems identified in the problematic system or environment 110. For example, the problematic system 110 input to the problem resolution controller 130 may include a particular process or application, a complex collection that includes multiple interacting processes, applications, and systems, or any other suitable subset associated with the problematic system 110, which in certain scenarios may include the entire problematic system 110. Furthermore, in one implementation, the problems identified in the problematic system or environment 110 and input to the problem resolution controller 130 may be loosely defined (e.g., the identified problems may range from minor issues that include less than desirable performance conditions to critical issues that include configuration or operational problems). In one implementation, the problem resolution controller 130 may generally parameterize the identified problems to derive one or more measurements that can determine whether or not the problems have been resolved. For example, the measurements that the problem resolution controller 130 uses to determine whether the problems have been resolved may include a Boolean comparison (e.g., whether or not the problem was fully resolved), a degree of improvement measurement (e.g., performance was improved by a certain percentage), or any other suitable measurements that parameterize the problems and the diagnostic outcome.

Accordingly, in one implementation, the system 100 may generally codify various problem resolution steps in one or more structured rules or structured rule sets that the problem resolution controller 130 can automatically use to diagnose the problematic system 100 in the parallel universe environment 145. In particular, as will be described in further detail below, the problem resolution steps may be entirely codified, contained, and managed in the diagnostic library 160, or the diagnostic library diagnostic library 160 may alternatively be federated with one or more external test management systems 170 that codify problem resolution criteria 175. Furthermore, because the problem resolution controller 130 may be simultaneously addressing multiple problems associated with the problematic system 110 (and/or other problematic systems 110), the input that identifies the particular problems in the problematic system 110 may further include an urgency or criticality parameter. In one implementation, the problem resolution controller may therefore reference the urgency or critical parameter to balance or otherwise allocate resources committed to simultaneously attempting to resolve various different problems (e.g., the problem resolution controller 130 may allocate more resources to critical problems than minor performance issues).

In one implementation, as noted above, the problem resolution controller 130 may create a master clone 140 that represents a virtual clone of the problematic system 110 in response to receiving a diagnostic request associated with the problematic system 110. In particular, the master clone 140 may permit the problem resolution controller 130 to attempt diagnostic processes to resolve the problem on a static copy of the problematic system 100, which may ensure that any symptoms associated with the problem do not change for reasons other than any diagnostic processes applied to the parallel universes 145 during problem resolution attempts (i.e., the diagnostic processes may cause certain changes to the parallel universes 145, which may or may not resolve the reported problem associated with the problematic system 110, whereby preserving the master clone may ensure that any changes to the parallel universes 145 can be attributed to the particular diagnostic processes attempted therein rather than live activity in the problematic system 110). In one implementation, in response to suitably creating the master clone 140 that represents the static copy of the problematic system 110, the problem resolution controller may then analyze the master clone 140 to verify that the master clone 140 exhibits the same problems or symptoms exhibited in the (cloned) problematic system 110. In one implementation, in response to verifying that the master clone 140 indeed exhibits the same problems or symptoms as the problematic system 110, the problem resolution controller 130 may proceed with the appropriate diagnostic attempts, or alternatively may probe the problematic system 110 to attempt re-creating the master clone 140 until the master clone 140 suitably exhibits the same problems or systems as the problematic system 110.

In one implementation, as noted above, the diagnostic library 160 may generally contain various codified problem resolution steps, in addition to various resolution verification tests that may be used to validate a potential solution to a problem that was found with the problem resolution steps. In one implementation, the codified problem resolution steps and the resolution verification tests may be available for the problem resolution controller 130 to apply in any suitable diagnostic effort. In one implementation, the problem resolution steps and the resolution verification tests contained in the diagnostic library 160 may include certain diagnostic processes available to apply to any problem exhibited in the problematic system 110, and may further include certain diagnostic processes having particular significance to a certain identifiable problem. For example, the various problem resolution steps contained in the diagnostic library diagnostic library 160 may include, among other things, restarting a process, rebooting a system, applying a missing patch, changing configuration settings, allocating additional memory, or any other suitable diagnostic processes that may resolve or diagnose a particular problem. Furthermore, in one implementation, the diagnostic library 160 may include the problem resolution steps and/or the resolution verification tests in a flat structure (i.e., individually representing certain problem resolution steps or resolution verification tests) or a hierarchical structure (i.e., representing potentially related problem resolution steps or resolution verification tests in a tree structure). Additionally, as noted above, the problem resolution steps and the resolution verification tests may be entirely codified, contained, and managed in the diagnostic library 160, or the diagnostic library diagnostic library 160 may be federated with one or more external test management systems 170 that codify problem resolution criteria 175.

In one implementation, the diagnostic library 160 may further maintain a weighting parameter associated with various problem resolution steps contained therein, wherein the weighting parameter may represent a likelihood that the associated problem resolution steps provide potential solutions to particular problems. Additionally, the diagnostic library 160 may maintain cost parameters associated with various problem resolution steps that codify estimated resource costs that executing the associated problem resolution steps will likely incur (e.g., estimated downtime likely incurred from executing a problem resolution step that attempts to diagnose a malfunctioning resource). In one implementation, values associated with the weighting parameters and values associated with the cost parameters may be adjusted, wherein the values may be adjusted manually or via an automated feedback mechanism that uses empirical evidence from previous diagnostic attempts to optimize or adjust the values. Furthermore, manual intervention to adjust the values associated with the weighting parameters or the cost parameters may occur at a template level (e.g., adjusting values associated with any problem resolution steps that may be hierarchically structured under a certain template), within a particular standalone problem resolution step or a particular problem resolution step associated with a set of problem resolution steps, or in any other suitable manner (e.g., adjusting values associated with various individual problem resolution steps, certain problem resolution steps that may have substantially similar criteria even though the problem resolution steps may be associated with different sets of problem resolution steps, etc.). Moreover, in one implementation, the diagnostic library 160 may include one or more resolution verification tests that the problem resolution controller 130 may execute to verify that applying a particular available solution in one of the parallel universes 145 did not create undesirable side effects. In one implementation, in response to determining that a particular solution did or did not create undesirable side effects, a risk rating parameter may be created to codify a likelihood that the solution will create undesirable side effects. The risk rating parameter may then be maintained in the diagnostic library 160 and subsequently used to distinguish a "best" solution (from multiple potentially successful solutions) to apply in the problematic system 110 to resolve the reported problem.

In one implementation, as noted above, the problem resolution controller 130 may use various parallel universes 145, which generally represent virtualized instantiations created from the master clone 140 of the problematic system 110, to simultaneously analyze various possible solutions to a particular problem. As such, the parallel and virtualized nature of the parallel universes 145 may enable the problem resolution controller 130 to use cloud computing power to attempt diagnosing the reported problem associated with the problematic system 110, substantially reduce an elapsed time associated with the attempts to diagnose the reported problem, and automatically perform the attempts to diagnose a solution to the reported problem outside the production environment associated with the problematic system 110. Moreover, the parallel and virtualized nature of the parallel universes 145 may enable the problem resolution controller 130 to perform certain problem resolution steps that could have otherwise been considered to risky to attempt in the live production system 110.

In one implementation, the problem resolution controller 130 may include or access a resource pool 150 that contains available virtualized resources, wherein the problem resolution controller 130 may instantiate various virtual machines from the available virtualized resources in the resource pool 150 to create the parallel universes 145 from the master clone 140. In one implementation, in response to determining that one or more of the problem resolution steps selected from the diagnostic library 160 contain a sub-tree of potential solutions, the problem resolution controller 130 may further create and maintain a "sub-master" clone 140. In particular, the problem resolution controller 130 may preserve the sub-master clone 140 to provide a source image that can be used to create parallel universes 145 that execute different branches of the potential solutions in the sub-tree. Furthermore, in one implementation, the problem resolution controller 130 may use the urgency or criticality parameter associated with the reported problem in the problematic system 110 to determine a number of the parallel universes 145 to create and dedicate to resolving the reported problem. In particular, the urgency or criticality parameter associated with the reported problem may be referenced in a context associated with any urgency or criticality parameters associated with other problems that the problem resolution controller 130 may be attempting to resolve at substantially the same time, wherein the problem resolution controller 130 may determine how many dedicated parallel universes 145 will be created to resolve the reported problem in order to suitably balance or allocate resources among the various different problems under diagnosis. Further, in one implementation, the number of parallel universes 145 that the problem resolution controller 130 dedicates to resolving the reported problem may dynamically vary in response to changing conditions associated with the set of problems currently subject to diagnosis (e.g., the problem resolution controller 130 may create additional parallel universes 145 in response to suitably resolving other problems having higher urgency or critical parameters, etc.).

In one implementation, as noted above, the problem resolution controller 130 may initially create the various parallel universes 145 dedicated to resolving a particular reported problem from the master clone 140 associated with the problematic system 110 (i.e., the problematic system 110 may be cloned to create the master clone 140, and the master clone 140 may be cloned to create the parallel universes 145). In one implementation, the problem resolution controller 130 may then identify various problem resolution steps in the diagnostic library 160 that have highest priorities and apply individual ones (or sets) of the highest priority problem resolution steps in individual ones of the parallel universes 145. In response to suitably completing the problem resolution steps in the individual parallel universes 145, the problem resolution controller 130 may then store results from the problem resolution steps in the diagnostic library 160. For example, in one implementation, the results associated with the problem resolution steps and stored in the diagnostic library 160 may include statistical metrics or other information on any resources used to conduct the problem resolution steps in addition to statistical metrics or other information on outcomes from the problem resolution steps. As such, the statistics associated with the resources used to conduct the problem resolution steps may be used to update the cost parameters maintained with the associated problem resolution steps, while the statistics associated with the outcomes from the problem resolution steps may be used to update the associated weighting parameters (e.g., representing a binary success or failure rating for certain problem resolution steps, quantifying a degree of success or failure for certain problem resolution steps, adjusting the parameters based on domain-dependent criteria, etc.).

In one implementation, in response to suitably completing any problem resolution steps in the parallel universes 145 and storing the results obtained therefrom, the problem resolution controller 130 may then recycle the resources previously used to create the parallel universes 145 and recreate a new parallel universe 145. In particular, the problem resolution controller 130 may generally deallocate the resources that were previously used to create a particular parallel universe 145 in response to suitably completing certain problem resolution steps therein, and then recycle the deallocated resources to create a new parallel universe 145 from the master clone 140 (i.e., the problem resolution controller 130 may repeatedly use the master clone 140 as a master virtual machine image for any newly created parallel universes 145). As such, the problem resolution controller 130 may continue to create new parallel universes 145 and conduct appropriate problem resolution steps in the parallel universes 145 until one or more potentially acceptable solutions to the reported problem have been found (e.g., using successes or failures associated with previously conducted problem resolution steps to combine or tweak subsequently applied problem resolution steps, applying statistical analysis to attempt different diagnostic problem resolution step permutations, etc.). Furthermore, in one implementation, a parameter may be associated with the reported problem to control whether the problem resolution controller 130 will stop creating and executing problem resolution steps in new parallel universes 145 once one potentially acceptable solution to the problem has been found, or whether the problem resolution controller 130 will continue creating and executing problem resolution steps in new parallel universes 145 until all potentially acceptable solutions have been identified. In one implementation, in scenarios where multiple potentially acceptable solutions have been found, the problem resolution controller 130 may then apply one or more of the potentially acceptable solutions to the original problematic system 110, either via manual or rule-based selection (e.g., if multiple different problem resolution steps resolved a problem relating to undesirable performance, the problem resolution controller 130 may select one of the problem resolution steps that most improved performance).

Furthermore, in one implementation, the problem resolution controller 130 may intercept and multicast input parameters 115 to the original problematic system 110 in order to resolve certain reported problems or conduct resolution verification tests on any potentially acceptable solutions that have been found. In particular, the monitoring engine 120 may monitor the problematic system 110 in a substantially continuous manner to detect any input parameters 115 to the problematic system 110, wherein the monitoring engine 120 may intercept and broadcast any such input parameters 115 to the problem resolution controller 130. As such, the problem resolution controller 130 may then multicast the input parameters 115 received from the monitoring engine 120 to one or more of the parallel universes 145 to ensure that the parallel universes 145 reflect a current operational state within the problematic system 110. Furthermore, the problem resolution controller 130 may analyze the input parameters 115 received from the monitoring engine 120 to determine whether the input parameters 115 have caused the problematic system 110 to change in a manner that diverges from the previously created master clone 140. Accordingly, in response to determining that the input parameters 115 have caused the problematic system 110 to diverge from the previously created master clone 140, the problem resolution controller 130 may create a new master clone 140 in order to synchronize the parallel universes 145 with the live production system 110.

Figure 2:
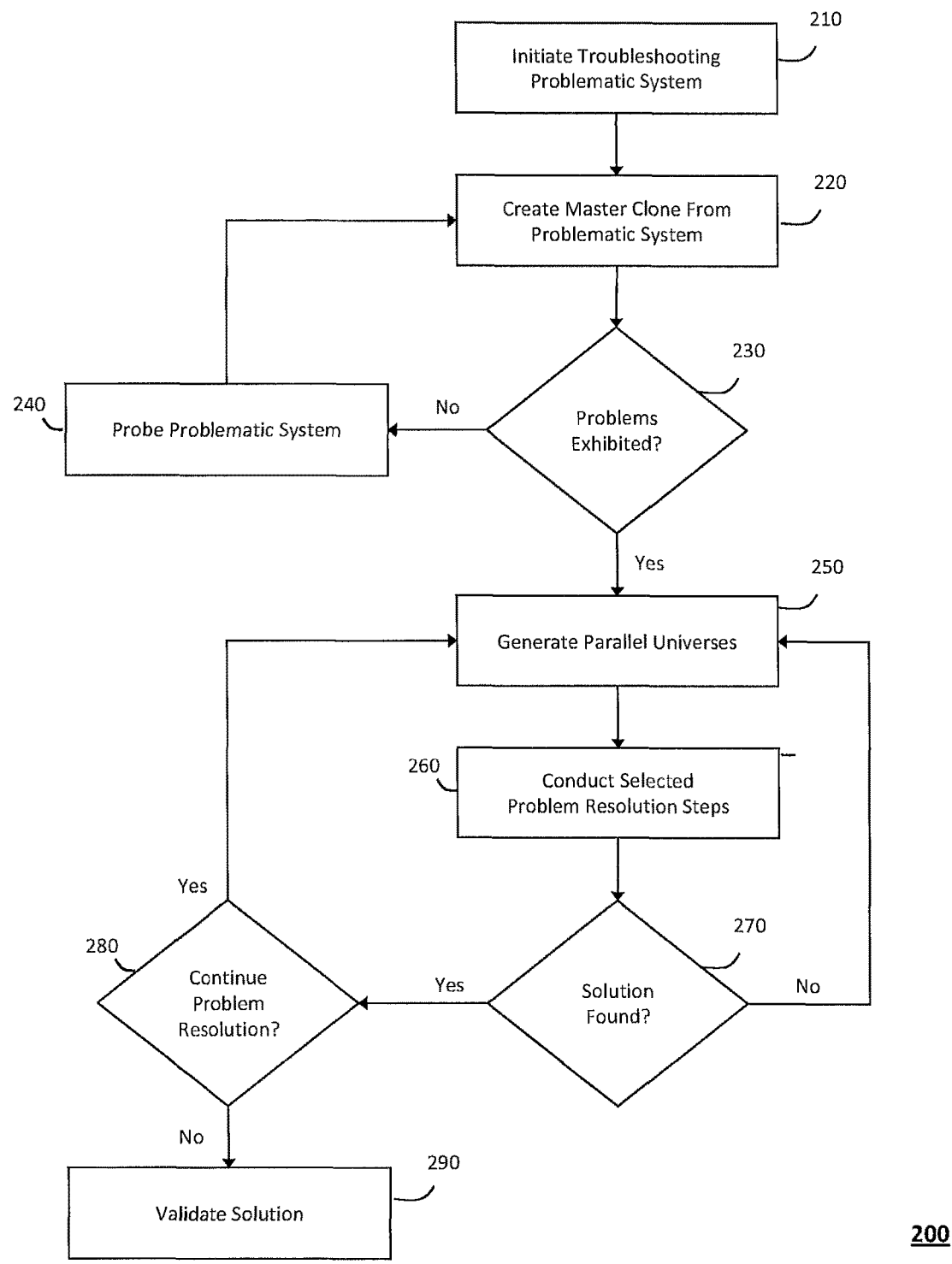
FIG. 2 illustrates an exemplary method for conducting one or more problem resolution steps in multiple virtual parallel universes to diagnose a problematic information technology system, according to one aspect of the invention.

According to one aspect of the invention, FIG. 2 illustrates an exemplary method 200 for conducting one or more problem resolution steps in multiple virtual parallel universes to diagnose a problematic information technology system. In particular, the method 200 illustrated in FIG. 2 may generally employ a virtualized infrastructure to automatically create various virtual machines that represent a problematic system. For example, many information technology systems have become increasingly virtualized, and the method 200 may therefore employ virtual machine technology to create an array with various "parallel universes" that represent virtual clones corresponding to the problematic system. As such, in one implementation, troubleshooting or other diagnostic efforts associated with a problematic system may be initiated in an operation 210, wherein the troubleshooting or other diagnostic efforts may be initiated in response to a request that reports one or more problems associated with the problematic system. For example, in response to suitably initiating the troubleshooting or other diagnostic efforts in operation 210, a problem resolution controller may attempt to identify one or more variables or conditions that may be contributing to the reported problem experienced in the problematic system. In particular, many diagnostic efforts commonly involve asking a customer or other user to perform certain actions to attempt diagnosing or otherwise resolving the problem.

Accordingly, the troubleshooting or other diagnostic efforts initiated in operation 210 may include the problem resolution controller performing various automated diagnostic attempts in parallel universes that represent different virtual instantiations cloned from the problematic system, wherein the automated diagnostic attempts that the problem resolution controller performs may generally model diagnostic efforts that a help desk engineer or other support entity would perform (or request a user to perform) in order to address a reported problem. Moreover, because the automated diagnostic efforts that the problem resolution controller can be performed in the parallel universes, which represent virtual instantiations cloned from the problematic system, the automated diagnostic efforts may be performed in parallel to the working production system experiencing the problem (i.e., the diagnostic efforts may be automated in the parallel universes to essentially simulate performing the diagnostic efforts in the problematic system without actually disrupting or interfering with availability in the live problematic system).

For example, in one implementation, the problem resolution controller may include a resource pool storing various virtual machine templates (e.g., virtual machine descriptions having pre-configured settings that can be used to create new virtual machines configured with such settings). As such, in response to initiating the troubleshooting or other diagnostic efforts in operation 210, the problem resolution controller may obtain one or more virtual machine templates from the resource pool that appropriately correspond to various resources in the problematic system. For example, in situations where the problematic system includes one or more virtualized resources, the resource pool may contain the virtual machine templates that were used to initially provision such virtualized resources in the problematic system, which the problem resolution controller may then suitably modify to reflect any changes that occurred subsequent to initially provisioning the virtualized resources in the problematic system. Furthermore, in situations where the problematic system includes any resources that are not virtualized, or where the resource pool does not already contain the templates corresponding to certain virtualized resources in the problematic system, the problem resolution controller may probe the problematic system to identify various hardware and software settings associated with such resources and create appropriate virtual machine templates associated therewith. In one implementation, an operation 220 may then include the problem resolution controller creating a master clone that represents a virtual clone of the problematic system, wherein the master clone may include one or more virtual machines cloned from one or more virtual machines that collectively represent the problematic system. As such, the master clone may permit performing diagnostic processes attempting to resolve the problem on a static copy of the problematic system, thereby ensuring that any symptoms associated with the problem do not change for reasons other than the attempted diagnostic processes.

In one implementation, in addition to the problematic system experiencing the reported problem (or certain processes or applications in the problematic system), an initial input to the method 200 may further include the particular problems experienced therein. In particular, the experienced problems that the method 200 attempts to diagnose may be loosely defined to encompass minor issues (e.g., less than desirable performance conditions), critical issues (e.g., configuration or operational problems), or any other suitable problem that a customer or user experiences in the problematic system. As such, in response to suitably creating the master clone that represents the virtual clone (or static copy) of the problematic system in operation 220, the problem resolution controller may then analyze the master clone in an operation 230 to verify that the master clone exhibits the same problems or symptoms exhibited in the (cloned) problematic system. In one implementation, in response to verifying that the master clone indeed exhibits the same problems or symptoms as the problematic system, the problem resolution controller may proceed with the appropriate diagnostic attempts, as will be described in further detail below, or alternatively an operation 240 may include probing the problematic system and then re-attempting to create the master clone in operation 220 until operation 230 results in a determination that the master clone suitably exhibits the same problems or systems as the problematic system.

In one implementation, as noted above, the problem resolution controller may use various parallel universes, which generally represent virtualized instantiations created from the master clone of the problematic system, to simultaneously analyze various possible solutions to a particular problem. As such, the parallel and virtualized nature of the parallel universes may enable the problem resolution controller to use cloud computing power to attempt diagnosing the reported problem associated with the problematic system, substantially reduce an elapsed time associated with the attempts to diagnose the reported problem, and automatically perform the attempts to diagnose a solution to the reported problem outside the production environment associated with the problematic system. Moreover, the parallel and virtualized nature of the parallel universes may enable the problem resolution controller to perform certain problem resolution steps that could have otherwise been considered to risky to attempt in the live production system (i.e., because the diagnostic processes may cause certain changes to the parallel universes, which could potentially exacerbate the reported problem, preserving the master clone may ensure that any changes to the parallel universes can be suitably discarded and attributed to the particular diagnostic processes attempted therein). As such, an operation 250 may include the problem resolution controller accessing the resource pool that contains the available virtualized resources, wherein operation 250 may include the problem resolution controller instantiating various virtual machines from the available virtualized resources in the resource pool to create the parallel universes from the master clone.

Furthermore, in one implementation, an urgency or criticality parameter associated with the reported problem may be used to determine a number of the parallel universes that will be created in operation 250 and dedicated to resolving the reported problem. In particular, the urgency or criticality parameter associated with the reported problem may be referenced in a context associated with any urgency or criticality parameters associated with other problems that the problem resolution controller may be attempting to resolve at substantially the same time, wherein the problem resolution controller may determine the number of dedicated parallel universes to create in operation 250 in order to suitably balance or allocate resources among the various different problems under diagnosis. Further, in one implementation, the number of parallel universes that the problem resolution controller dedicates to resolving the reported problem may dynamically vary in response to changing conditions associated with the set of problems currently subject to diagnosis. For example, in response to suitably resolving other problems having higher urgency or critical parameters, the problem resolution controller may automatically initiate operation 250 to dedicate additional parallel universes to the reported problem. In another example, in response to a newly reported problem having high a urgency or critical parameter, the problem resolution controller may automatically return to operation 250 to deallocate one or more parallel universes to free resources that can be dedicated to the newly reported problem. Moreover, various other examples in which the number of parallel universes may be dynamically increased or decreased will be apparent, whether or not explicitly described herein.

In one implementation, an operation 260 may then include referencing a diagnostic library, which may be created either statically or dynamically, to select one or more actions, problem resolution steps, or other diagnostic processes that may potentially resolve the problem. In particular, the actions, problem resolution steps, or other diagnostic processes selected in operation 260 may then be conducted in the previously created parallel universes to conduct automated diagnostic trials therein. For example, in one implementation, the problem resolution steps selected from the diagnostic library and conducted in operation 260 may include one or more problem resolution steps that have highest priorities, which may be individually applied within individual ones of the parallel universes. In another example, the selected problem resolution steps conducted in operation 260 may include certain problem resolution steps that may be applied to any suitable problem and/or certain diagnostic processes having particular significance to the reported problem. In particular, the diagnostic library may maintain weighting parameters that represent a likelihood that associated problem resolution steps provide potential solutions to particular problems and cost parameters that codify estimated resource costs that executing associated problem resolution steps will likely incur. As such, the particular problem resolution steps conducted in operation 260 may be selected based on relevance to the reported problem, which may be determined based on a comparison between criteria associated with the reported problem and information associated with the weighting and/or cost parameters. Moreover, in one implementation, certain problem resolution steps in the diagnostic library may contain sub-trees of potential solutions, whereby in response to the particular problem resolution steps conducted in operation 260 including one or more of such problem resolution steps, operation 260 may further include creating a "sub-master" clone that provides a source image that can be cloned to create further parallel universes that execute different branches of the potential solutions in the sub-tree.

In one implementation, In response to operation 260 suitably completing the problem resolution steps conducted in the individual parallel universes, an operation 270 may include analyzing and storing results produced from the problem resolution steps. For example, the reported problem may be suitably parameterized to derive one or more measurements or other criteria that can be used to determine whether or not the problem was resolved (e.g., a Boolean measurement, a degree of improvement measurement, etc.). As such, operation 270 may include storing results from the problem resolution steps conducted in operation 260, wherein the results may include statistical metrics on resources used to conduct the problem resolution steps, outcomes from the problem resolution steps, or any other suitable information that may be used to assist the current or subsequent diagnostic efforts. For example, any statistical metrics associated with the resources used to conduct the problem resolution steps may be used to update the cost parameters maintained with the associated problem resolution steps, while the statistical metrics associated with the outcomes from the problem resolution steps may be used to update the associated weighting parameters (e.g., representing a binary success or failure rating for certain problem resolution steps, quantifying a degree of success or failure for certain problem resolution steps, adjusting the parameters based on domain-dependent criteria, etc.).

Furthermore, in one implementation, operation 270 may further include the problem resolution controller determining whether one or more of the problem resolution steps yielded a potentially successful solution to the problem based on the statistics, measurements, criteria, or other results produced from the problem resolution steps conducted in the parallel universes, wherein the method 200 may return to operation 250 to continue the diagnostic efforts in response to determining that a potentially successful solution was not found from the selected conducted in the parallel universes. In particular, in response to returning to operation 250, the problem resolution controller may recycle the resources previously used to create the parallel universes and create one or more new parallel universes from the master clone (i.e., the master clone may be repeatedly used as a master image for any parallel universes created in initial operation 250 or subsequent operations 250). As such, the problem resolution controller may continue to create new parallel universes in operation 250 and conduct appropriate problem resolution steps therein in operation 260 until operation 270 results in a determination that one or more potentially acceptable solutions to the reported problem have been found. For example, the problem resolution steps conducted in subsequent operations 260 may use success or failure determinations associated with previously conducted problem resolution steps to combine certain previously conducted problem resolution steps or portions thereof, apply statistical analysis to attempt different diagnostic problem resolution step permutations, conduct different problem resolution steps that were not previously selected due to relatively lower priorities or weighting/cost parameters, or otherwise tweak the subsequently conducted problem resolution steps.

In one implementation, in response to determining that one or more potentially acceptable solutions to the reported problem have been found in operation 270, a parameter may control whether or not the problem resolution controller will stop the diagnostic effort. In particular, an operation 280 may include determining whether the parameter indicates that the problem resolution controller will stop creating and executing problem resolution steps in new parallel universes in response to finding one potentially acceptable solution to the problem, or whether the problem resolution controller will continue to create and execute problem resolution steps in new parallel universes until all potentially acceptable solutions have been found. Thus, in response to finding one or more potentially acceptable solutions in operation 270, the control parameter may be referenced in operation 280 to determine whether to return to operation 250 (as described above), or whether to attempt to apply an appropriate solution to the problematic universe. Accordingly, in response to operation 280 resulting in a determination that the problem resolution controller should stop executing problem resolution steps in additional parallel universes, an operation 290 may include validating any potentially acceptable solutions that have been found, as will be described in further detail below with reference to FIG. 3.

Figure 3:
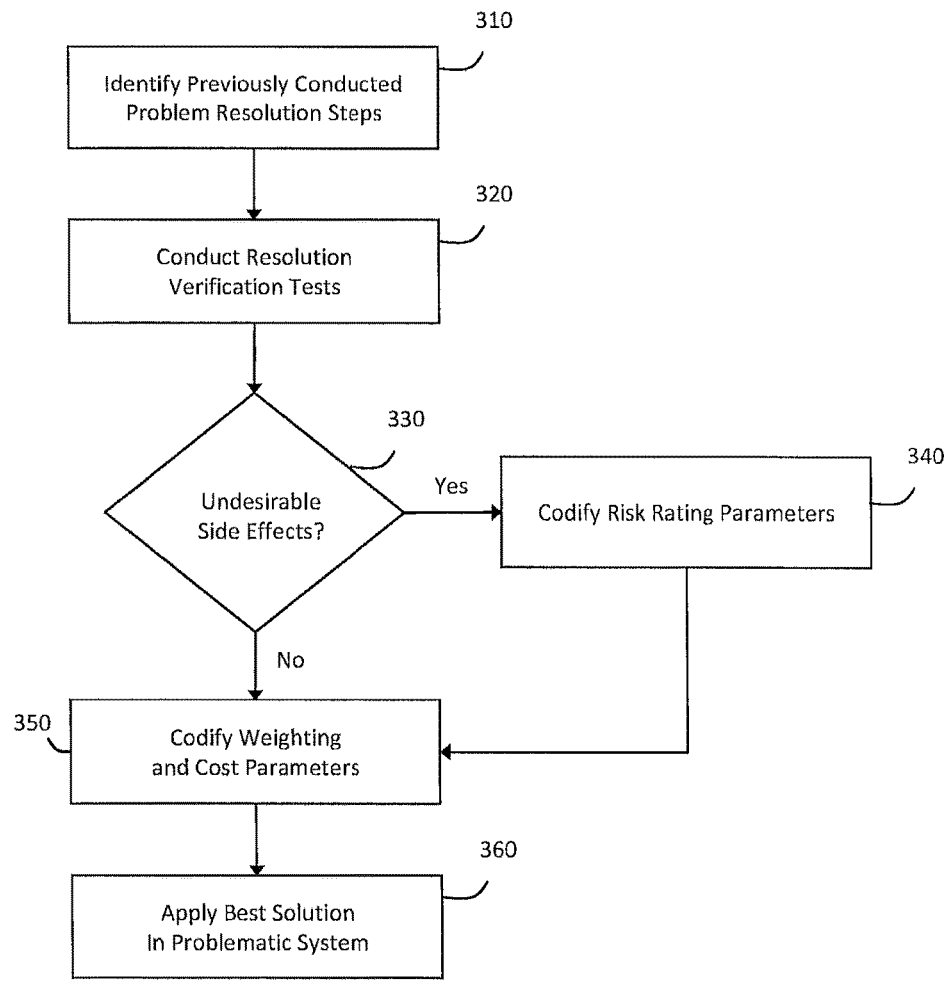
FIG. 3 illustrates an exemplary method for validating a potential solution to resolve a problematic information technology system, according to one aspect of the invention.

According to one aspect of the invention, FIG. 3 illustrates an exemplary method 300 for validating a potential solution to resolve a problematic information technology system. In particular, the method 300 illustrated in FIG. 3 may generally performed in response to the method shown in FIG. 2 and described above suitably finding one or more potentially acceptable solutions to a reported problem in a problematic system. In particular, an operation 310 may include identifying one or more problem resolution steps that produced potentially acceptable solutions to the reported problem following the problem resolution steps being conducted in one or more parallel universes that represent virtual clones corresponding to the problematic system. In one implementation, one or more resolution verification tests may then be conducted in an operation 320 to validate one or more problem resolution steps that produced the potentially acceptable solutions. In particular, the one or more resolution verification tests may be executed in one or more parallel universes in operation 320, wherein conducting the resolution verification tests may generally include applying the potentially acceptable solutions in one or more parallel universes that further represent the problematic system. As such, an operation 330 may include determining whether applying the potentially successful solutions to the parallel universes created undesirable side effects.

Accordingly, in response to determining that a particular potentially acceptable solution created undesirable side effects, an operation 340 may include codifying a risk rating parameter that defines a likelihood that such solution will create undesirable side effects if that solution was applied in the problematic system. Alternatively, in response to determining that certain potentially acceptable solutions did not create undesirable side effects, operation 340 may be skipped, whereby the potentially acceptable solution may have a null risk rating parameter to indicate that such solution will likely not create any undesirable side effects if applied in the problematic system. In either scenario, an operation 350 may include codifying or adjusting any weighting parameters or cost parameters associated with the problem resolution steps that produced the potentially acceptable solutions. For example, because every problem resolution step identified in operation 310 produced a potentially acceptable solution, operation 350 may include adjusting the weighting parameters associated therewith to increase the value indicating that such problem resolution steps will likely produce a successful solution (although the increased value for the weighting parameter will be evaluated in view of any risk rating parameters for problem resolution steps that produced acceptable solutions with undesirable side effects). Furthermore, operation 350 may include adjusting the cost parameters associated with the problem resolution steps that produced the potentially acceptable solutions based on estimated resource costs associated therewith (e.g., any undesirable side effects may be further used to tune the cost parameters in scenarios where the undesirable side effects relate to resource downtimes or other potential resource impacts). Thus, in one implementation, an operation 260 may then include analyzing the weighting parameters, cost parameters, and/or any risk rating parameters associated with the problem resolution steps that produced the potentially acceptable solutions to distinguish one problem resolution step (or set of problem resolution steps) that produced a "best" solution, which may then be applied in the problematic system to resolve the reported problem (e.g., if multiple problem resolution steps may solve the problem, the best solution may be selected either via manual or rule-based selection).

Figure 4:
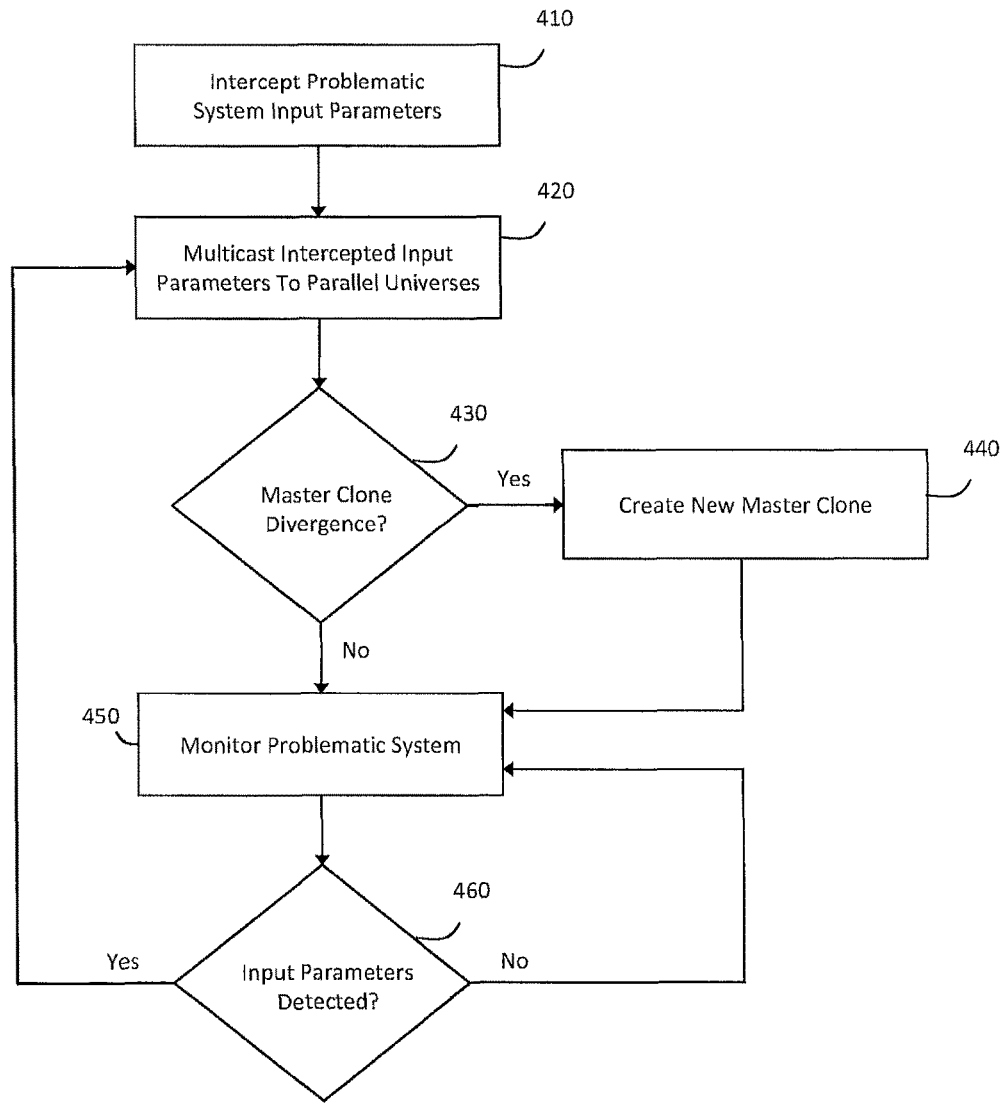
FIG. 4 illustrates an exemplary method for synchronizing multiple virtual parallel universes diagnosing a problematic information technology system with live input parameters to the problematic information technology system, according to one aspect of the invention.

According to one aspect of the invention, FIG. 4 illustrates an exemplary method 400 for synchronizing multiple virtual parallel universes diagnosing a problematic information technology system with live input parameters to the problematic information technology system. In particular, the method 400 illustrated in FIG. 4 may generally include a monitoring engine observing any activity that occurs in a problematic system under diagnosis in the one or more parallel universes, wherein an operation 410 may include the monitoring engine intercepting any input parameters to the live problematic system. In one implementation, the monitoring engine may then broadcast the input parameters intercepted in the problematic system to a problem resolution controller currently diagnosing the problematic system, which may then multicast the input parameters to the parallel universe environment in an operation 420 (e.g., to ensure that the parallel universe environment suitably represents ongoing activity that may occur in the problematic system subsequent to the problem resolution controller creating the parallel universes).

Furthermore, in one implementation, an operation 430 may include the problem resolution controller analyzing the input parameters multicasted to the parallel universes to determine whether the input parameters have caused the problematic system to diverge from a master clone previously created to represent a virtual instantiation of the problematic system. Accordingly, in response to determining that the input parameters have caused the problematic system to diverge from the previously created master clone, an operation 440 may include the problem resolution controller creating a new master clone to synchronize the parallel universe environment, which includes one or more parallel universes created from the master clone, with the live production system. In one implementation, regardless of whether or not the input parameters caused the problematic system to diverge from the previously created master clone, thereby resulting in creating a new master clone, the monitoring engine may continue to monitor the problematic system in an operation 450, wherein the method 400 may return to operation 420 in response to the monitoring engine detecting any further input parameters to the problematic system in an operation 460. On the other hand, if the monitoring engine does not detect any further input parameters to the problematic system in operation 460, the method 400 may return to operation 450 to continue monitoring the problematic system to detect any further input parameters. As such, the monitoring engine may generally monitor the problematic system in a substantially continuous manner to detect any input parameters to the problematic system in iteratively performed operations 420 through 460, wherein the monitoring engine may intercept and broadcast any such input parameters to the problem resolution controller, which then multicasts the input parameters to the parallel universe environment and/or creates new master clones, as appropriate. As such, the method 400 shown in FIG. 4 and described herein may ensure that the parallel universe environment always reflects a current operational state in the problematic system.

In an embodiment, there is provided a system for diagnosing information technology systems in multiple virtual parallel universes, comprising: an information technology system having one or more resources; and a problem resolution controller coupled to the information technology system, wherein the problem resolution controller includes one or more processors configured to: receive a diagnostic request that identifies one or more problems associated with the information technology system; create one or more parallel universes cloned from the information technology system, wherein the one or more parallel universes include one or more virtualized resources cloned from the one or more resources in the information technology system; conduct one or more problem resolution steps in the one or more parallel universes, wherein the one or more problem resolution steps attempt to find one or more solutions to the one or more problems associated with the information technology system; and apply one or more solutions found with the one or more problem resolution steps to the information technology system to resolve the one or more problems associated with the information technology system.

In an embodiment, the one or more processors associated with the problem resolution controller are further configured to: create the one or more virtualized resources cloned from the one or more resources in the information technology system, wherein the one or more virtualized resources represent the one or more resources in the information technology system; and create a master clone that includes the one or more virtualized resources to represent the information technology system, wherein the one or more processors associated with the problem resolution controller are configured to clone the master clone to create the one or more parallel universes. In an embodiment, the one or more processors associated with the problem resolution controller are further configured to: validate whether the master clone experiences the one or more problems associated with the information technology system; and conduct the one or more problem resolution steps in the one or more parallel universes in response to validating that the master clone experiences the one or more problems associated with the information technology system. In an embodiment, the one or more processors associated with the problem resolution controller are further configured to: recycle the one or more virtualized resources associated with the one or more parallel universes to create one or more new parallel universes from the master clone in response to determining that the one or more problem resolution steps conducted in the one or more parallel universes did not find any solutions to the one or more problems; and conduct one or more additional problem resolution steps in the one or more new parallel universes, wherein the one or more additional problem resolution steps find the one or more solutions to the one or more problems associated with the information technology system. In an embodiment, the method further comprises a monitoring engine configured to intercept one or more input parameters to the information technology system, wherein the one or more processors associated with the problem resolution controller are further configured to recreate the master clone in response to determining that the one or more input parameters have caused the information technology system to diverge from the previously created master clone. In an embodiment, the method further comprises a diagnostic library configured to store one or more statistics that describe results associated with the one or more problem resolution steps conducted in the one or more parallel universes, wherein the one or more statistics include one or more weighting parameters that describe likelihoods that the one or more problem resolution steps will find a potentially acceptable solution to the one or more problems. In an embodiment, the system further comprises a diagnostic library configured to store one or more statistics that describe results associated with the one or more problem resolution steps conducted in the one or more parallel universes, wherein the one or more statistics include one or more cost parameters that describe estimated resource costs associated with conducting the one or more problem resolution steps in the one or more parallel universes. In an embodiment, the one or more processors associated with the problem resolution controller are further configured to: recycle the one or more virtualized resources associated with the one or more parallel universes to create one or more new parallel universes in response to the one or more problem resolution steps finding the one or more solutions; and conduct one or more resolution verification tests that apply the one or more solutions to the one or more new parallel universes, wherein the one or more processors apply the one or more solutions to the information technology system in response to validating that applying the one or more solutions to the one or more new parallel universes does not cause one or more undesirable side effects in the one or more new parallel universes. In an embodiment, the one or more processors associated with the problem resolution controller are further configured to codify a risk rating parameter associated with the one or more solutions in response to determining that applying the one or more solutions to the one or more new parallel universes causes one or more undesirable side effects. In an embodiment, the method further comprises a monitoring engine configured to intercept one or more input parameters to the information technology system, wherein the one or more processors associated with the problem resolution controller multicast the one or more input parameters to the one or more parallel universes.

In an embodiment, there is provided a method for diagnosing information technology systems in multiple virtual parallel universes, comprising: receiving a diagnostic request that identifies one or more problems associated with an information technology system having one or more resources; create one or more parallel universes cloned from the information technology system, wherein the one or more parallel universes include one or more virtualized resources cloned from the one or more resources in the information technology system; conducting one or more problem resolution steps in the one or more parallel universes, wherein the one or more problem resolution steps attempt to find one or more solutions to the one or more problems associated with the information technology system; and applying one or more solutions found with the one or more to the information technology system to resolve the one or more problems associated with the information technology system.

In an embodiment, the method further comprises creating the one or more virtualized resources cloned from the one or more resources in the information technology system, wherein the one or more virtualized resources represent the one or more resources in the information technology system; and creating a master clone that includes the one or more virtualized resources to represent the information technology system, wherein a problem resolution controller creates the one or more parallel universes from the master clone. In an embodiment, the method further comprises: validating whether the master clone experiences the one or more problems associated with the information technology system; and conducting the one or more problem resolution steps in the one or more parallel universes in response to validating that the master clone experiences the one or more problems associated with the information technology system. In an embodiment, the method further comprises: recycling the one or more virtualized resources associated with the one or more parallel universes to create one or more new parallel universes from the master clone in response to determining that the one or more problem resolution steps conducted in the one or more parallel universes did not find any solutions to the one or more problems; and conducting one or more additional problem resolution steps in the one or more new parallel universes, wherein the one or more additional problem resolution steps find the one or more solutions to the one or more problems associated with the information technology system. In an embodiment, the method further comprises: intercepting one or more input parameters to the information technology system; and recreating the master clone in response to determining that the one or more input parameters have caused the information technology system to diverge from the previously created master clone. In an embodiment, the method further comprises storing one or more statistics that describe results associated with conducting the one or more problem resolution steps in a diagnostic library, wherein the one or more statistics include one or more weighting parameters that describe likelihoods that the one or more problem resolution steps will find a potentially acceptable solution to the one or more problems. In an embodiment, the method further comprises storing one or more statistics that describe results associated with conducting the one or more problem resolution steps in a diagnostic library, wherein the one or more statistics include one or more cost parameters that describe estimated resource costs associated with conducting the one or more problem resolution steps in the one or more parallel universes. In an embodiment, the method further comprises recycling the one or more virtualized resources associated with the one or more parallel universes to create one or more new parallel universes in response to the one or more problem resolution steps finding the one or more solutions; and conducting one or more resolution verification tests that apply the one or more solutions to the one or more new parallel universes, wherein a problem resolution controller applies the one or more solutions to the information technology system in response to validating that applying the one or more solutions to the one or more new parallel universes does not cause one or more undesirable side effects in the one or more new parallel universes. In an embodiment, the method further comprises codifying a risk rating parameter associated with the one or more solutions in response to determining that applying the one or more solutions to the one or more new parallel universes causes one or more undesirable side effects. In an embodiment, the method further comprises intercepting one or more input parameters to the information technology system; and multicasting the one or more input parameters to the one or more parallel universes.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system to diagnose an information technology system, the system comprising:
   one or more hardware processors; and
   diagnosis software coupled or couplable to an information technology system having a resource, wherein the diagnosis software is stored in memory and configured to cause the one or more processors to:
   receive a diagnostic request associated with the information technology system having the resource;
   create a plurality of parallel universes cloned from the information technology system, wherein each of the plurality of parallel universes comprises a virtualized resource cloned from the resource in the information technology system; and
   apply a diagnosis operation to the virtualized resource of each of the plurality of parallel universes, wherein the diagnosis operations attempt to find a problem, or a cause thereof, associated with the information technology system from the results of the diagnosis operations applied to the plurality of parallel universes.

2. The system of claim 1, wherein the diagnosis software is further configured to apply a problem resolution operation to the virtualized resource of each of the plurality of parallel universes, wherein the problem resolution operations attempt to find a solution to the problem associated with the information technology system from the results of the problem resolution operations applied to the plurality of parallel universes.

3. The system of claim 1, wherein the diagnosis software is configured to create a master clone, that comprises a virtualized resource cloned from the resource in the information technology system, to represent the information technology system, and create the plurality of parallel universes from the master clone, wherein each of the parallel universes comprises the virtualized resource cloned from the resource in the information technology system.

4. The system of claim 3, wherein the diagnosis software is configured to validate whether the master clone experiences a same problem or symptom as associated with the information technology system.

5. The system of claim 3, wherein the diagnosis software is configured to:
   obtain an input parameter to the information technology system; and
   recreate the master clone in response to determining that the input parameter has caused the information technology system to diverge from the previously created master clone.

6. A method to diagnose an information technology system, the method comprising:

receiving, with a computer system, a diagnostic request associated with an information technology system having a resource;

creating, with the computer system, a plurality of parallel universes cloned from the information technology system, wherein each of the plurality of parallel universes comprises a virtualized resource cloned from the resource in the information technology system; and applying, with the computer system, a diagnosis operation to the virtualized resource of each of the plurality of parallel universes, wherein the diagnosis operations attempt to find a problem, or a cause thereof, associated with the information technology system from the results of the diagnosis operations applied to the plurality of parallel universes.

7. The method of claim 6, comprising applying a problem resolution operation to the virtualized resource of each of the plurality of parallel universes, wherein the problem resolution operations attempt to find a solution to the problem, or the cause thereof, associated with the information technology system from the results of the problem resolution operations applied to the plurality of parallel universes.

8. The method of claim 7, further comprising creating a master clone, that comprises a virtualized resource cloned from the resource in the information technology system, to represent the information technology system, and creating the plurality of parallel universes from the master clone, wherein each of the parallel universes comprises the virtualized resource cloned from the resource in the information technology system.

9. The method of claim 8, further comprising validating whether the master clone experiences a same problem or symptom as associated with the information technology system.

10. The method of claim 8, further comprising:
obtaining an input parameter to the information technology system; and
recreating the master clone in response to determining that the input parameter has caused the information technology system to diverge from the previously created master clone.

11. A non-transitory computer readable medium storing computer executable instructions to diagnose an information technology system, the instructions operable when executed to effectuate operations comprising:
receive a diagnostic request associated with an information technology system having a resource;
create a plurality of parallel universes cloned from the information technology system, wherein each of the plurality of parallel universes comprises a virtualized resource cloned from the resource in the information technology system; and
apply a diagnosis operation to the virtualized resource of each of the plurality of parallel universes, wherein the diagnosis operations attempt to find a problem, or a cause thereof, associated with the information technology system from the results of the diagnosis operations applied to the plurality of parallel universes.

12. The computer readable medium of claim 11, wherein the instructions are further operable when executed to apply a problem resolution operation to the virtualized resource of each of the plurality of parallel universes, wherein the problem resolution operations attempt to find a solution to the problem associated with the information technology system from the results of the problem resolution operations applied to the plurality of parallel universes.

13. The computer readable medium of claim 11, wherein the instructions are further operable when executed to create a master clone, that comprises a virtualized resource cloned from the resource in the information technology system, to represent the information technology system, and create the plurality of parallel universes from the master clone, wherein each of the parallel universes comprises the virtualized resource cloned from the resource in the information technology system.

14. A method to diagnose an information technology system, the method comprising:
receiving, with a computer system, a diagnostic request associated with the information technology system;
creating, with the computer system, a master clone, that comprises a virtualized resource cloned from the resource in the information technology system, to represent the information technology system;
validating, with the computer system, whether the master clone experiences same or similar symptoms as those associated with the information technology system;
creating, with the computer system, a parallel universe cloned from the master clone, wherein the parallel universe comprises the virtualized resource cloned from the resource in the information technology system; and
conducting, with the computer system, a diagnosis step in the parallel universe responsive to validating that the master clone experiences same or similar symptoms as those associated with the information technology system, wherein the diagnosis operation attempts to find a problem, or a cause thereof, associated with the information technology system.

15. The method of claim 14, further comprising creating the virtualized resource cloned from the resource in the information technology system, wherein the virtualized resource represents the resource in the information technology system.

16. The method of claim 14, further comprising:
recycling the virtualized resource associated with the parallel universe to create a new parallel universe from the master clone; and
conducting an additional diagnosis step in the new parallel universe, wherein the additional diagnosis step finds the problem, or the cause thereof, associated with the information technology system.

17. The method of claim 14, further comprising:
obtaining an input parameter to the information technology system; and
recreating the master clone in response to determining that the input parameter has caused the information technology system to diverge from the previously created master clone.

18. The method of claim 14, further comprising storing a statistic that describes a result associated with conducting a problem resolution step, in a diagnostic library, wherein the statistic comprises a weighting parameter that describes a likelihood that the problem resolution step will find a potentially acceptable solution to the problem or a cost parameter that describes an estimated resource cost associated with conducting the problem resolution step in the parallel universe.

19. The method of claim 14, further comprising:
recycling the virtualized resource associated with the parallel universe to create a new parallel universe in response to a problem resolution step finding a solution to the problem, or a cause thereof;

conducting a resolution verification test that applies the solution to the new parallel universe; and determining whether applying the solution to the new parallel universe does not cause an undesirable side effect in the new parallel universe.

* * * * *